United States Patent [19]

Smith

[11] Patent Number: 6,089,329
[45] Date of Patent: Jul. 18, 2000

[54] IMPLEMENT WING WEIGHT TRANSFER APPARATUS

[75] Inventor: David R. Smith, Fort Jennings, Ohio

[73] Assignee: Unverferth Manufacturing Company, Inc., Kalida, Ohio

[21] Appl. No.: 09/450,225

[22] Filed: Nov. 29, 1999

[51] Int. Cl.[7] .................................................. A01B 63/00
[52] U.S. Cl. ............................................................ 172/452
[58] Field of Search .................................. 172/452, 454, 172/455, 480, 482, 497, 506

[56] References Cited

U.S. PATENT DOCUMENTS

| | | | |
|---|---|---|---|
| 2,797,542 | 7/1957 | Webster et al. | 172/455 X |
| 2,838,987 | 6/1958 | Burton | 172/454 X |
| 2,919,754 | 1/1960 | Walberg | 172/455 X |
| 2,955,664 | 10/1960 | Pehler et al. | 172/455 X |
| 2,970,657 | 2/1961 | Toland | 172/455 |
| 5,810,092 | 9/1998 | Selvatici | 172/497 X |

*Primary Examiner*—Christopher J. Novosad
*Attorney, Agent, or Firm*—Rothwell, Figg, Ernst & Mandeck, P.C.

[57] ABSTRACT

An implement wing weight transfer apparatus is provided according to the invention for an implement having a first panel hinged to a second panel, with the first panel capable of folding with respect to the second panel. The implement wing weight transfer apparatus comprises a biasing device, with a first end of the biasing device being fixedly connected to the second panel and a second end of the biasing device being slidably connected to the second panel, a first weight transfer link, having first and second ends, with the first end rotatably connected to the second end of the biasing device, and a second weight transfer link, having first and second ends, with a first end rotatably connected to the second end of the first weight transfer link and with a second end of the second weight transfer link rotatably connected to the first panel, wherein in a transport mode the first and second weight transfer links fold up to allow the folding of the first panel with respect to the second panel, and in an operational mode the biasing device exerts a weight transfer bias tension on the first and second weight transfer links.

11 Claims, 10 Drawing Sheets

IMPLEMENT WING WEIGHT TRANSFER APPARATUS

BACKGROUND OF THE INVENTION

1. Field of the Invention

The present invention relates generally to an implement wing weight transfer apparatus.

2. Description of the Background Art

Agricultural equipment includes many types of implements. One such implement is a tillage implement used to till the soil to kill weeds and any unwanted growing plants. Tillage implements generally work on the principle of killing plants by turning over a top layer of soil or by cutting or damaging the root systems of plants below the surface of the soil.

Many types of tillage equipment exist, and vary according to soil type, plant type, terrain, crop type, and farmer preference. One variation in tillage implements is size. Farms (and therefore field size) over the years have shown a trend of steady increase in size due to the economies of scale. Therefore, implement sizes have correspondingly increased.

Increased implement size is not unbounded, however, as most implements are still transported between fields via roads and are therefore limited in size by a need to be conveniently and safely transported. In a transport mode, implements typically fold up to present a relatively small span, and unfold for an operational mode. Typically one or more pair of panels or wings are hinged to a center frame and hitch, and rotate upwardly and inwardly to a transport position. As a result, implements in a transport position may present a span of approximately one third of an operational span.

Commonly, the folding and unfolding actions are performed by actuators such as hydraulic cylinders. The wings are hinged to the frame and may be folded in numerous ways. In an operational mode, the wings are substantially collinear to and level with the frame, so that tillage tools suspended below the frame are at a substantially even height (or depth). However, the frame portion (the central structure) is generally heavier in construction than the wings and usually includes a hitch, and may include auxiliary devices such as a fertilizer tank, for example. As a result, the frame portion is heavier than the wings. Consequently, more load is placed on the tillage tools suspended below the frame, and therefore the wings may encounter greater problems in holding the tillage tools in the soil.

Related art implements solve this problem by maintaining a constant hydraulic pressure on the cylinders used to fold the wings in order to keep a down pressure on the wings. A second method uses a constant hydraulic pressure to maintain a force on an elastic means (i.e., spring) which maintains a force on the wings.

However, the related art solution presents several drawbacks. A constant hydraulic pressure tends to hold the wings in a substantially fixed position with respect to the frame. This does not accommodate uneven terrain, and in locations where the terrain under a wing is lower than terrain under the frame, the tillage tools of the wing may ride partially or completely out of the soil. Second, the maintenance of a hydraulic pressure to maintain a force on an elastic means places additional strain on the implement hydraulic system (i.e., hoses, seals, pump, etc.).

There remains a need in the art, therefore, for an improved implement wing weight transfer apparatus.

SUMMARY OF THE INVENTION

An implement wing weight transfer apparatus is provided according to the invention for an implement having a first panel hinged to a second panel, with the first panel capable of folding with respect to the second panel. The implement wing weight transfer apparatus comprises a biasing device, with a first end of the biasing device being fixedly connected to the second panel and a second end of the biasing device being slidably connected to the second panel, a first weight transfer link, having first and second ends, with the first end rotatably connected to the second end of the biasing device, and a second weight transfer link, having first and second ends, with a first end rotatably connected to the second end of the first weight transfer link and with a second end of the second weight transfer link rotatably connected to the first panel, wherein in a transport mode the first and second weight transfer links fold up to allow the folding of the first panel, and in an operational mode the biasing device exerts a weight transfer bias tension on the first and second weight transfer links.

The above and other features and advantages of the present invention will be further understood from the following description of the preferred embodiment thereof, taken in conjunction with the accompanying drawings.

DETAILED DESCRIPTION OF THE PREFERRED EMBODIMENTS

Figure 1:
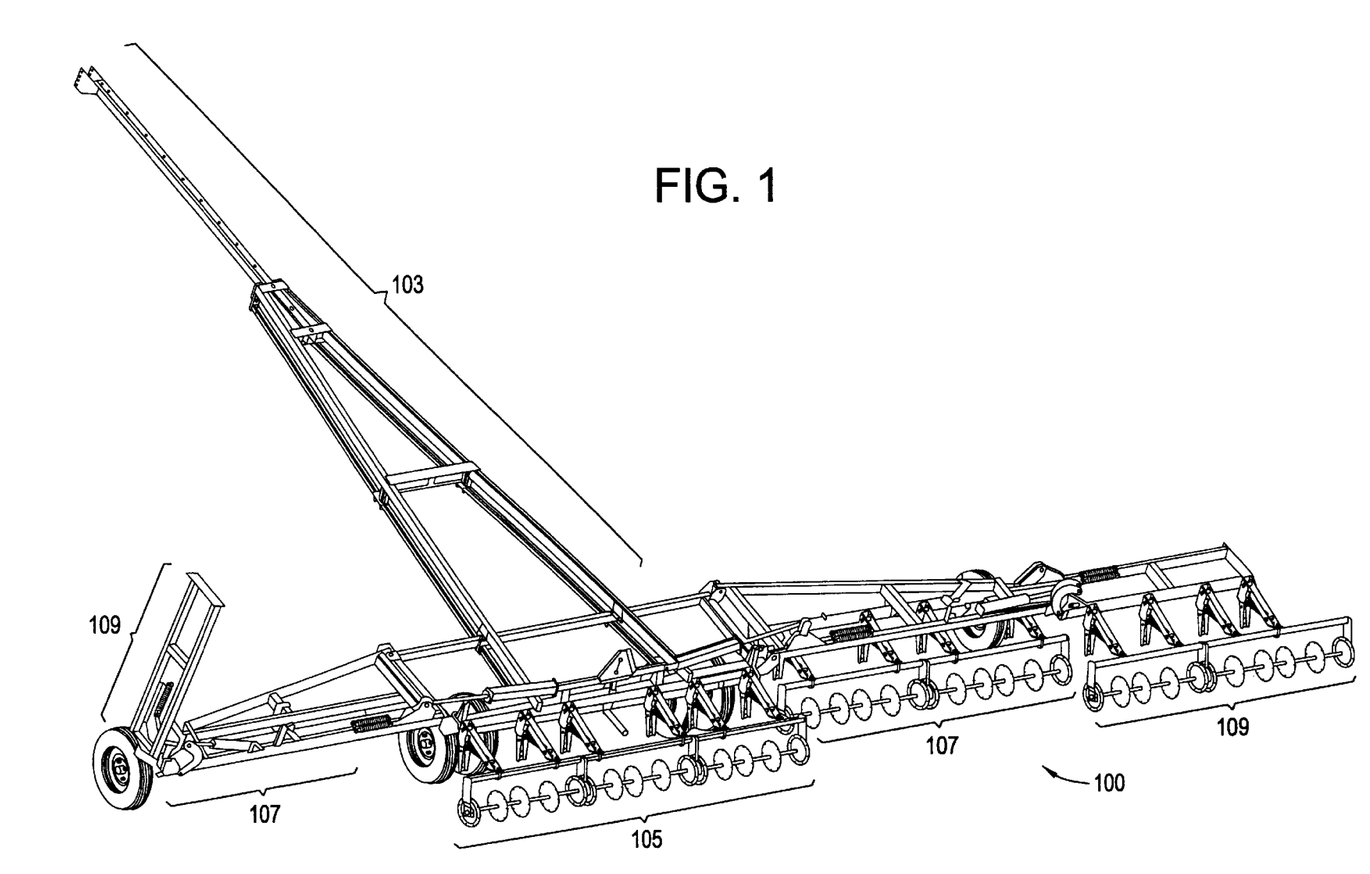
FIG. 1 shows an implement with an outer wing partially through a folding process.
Figure 2:
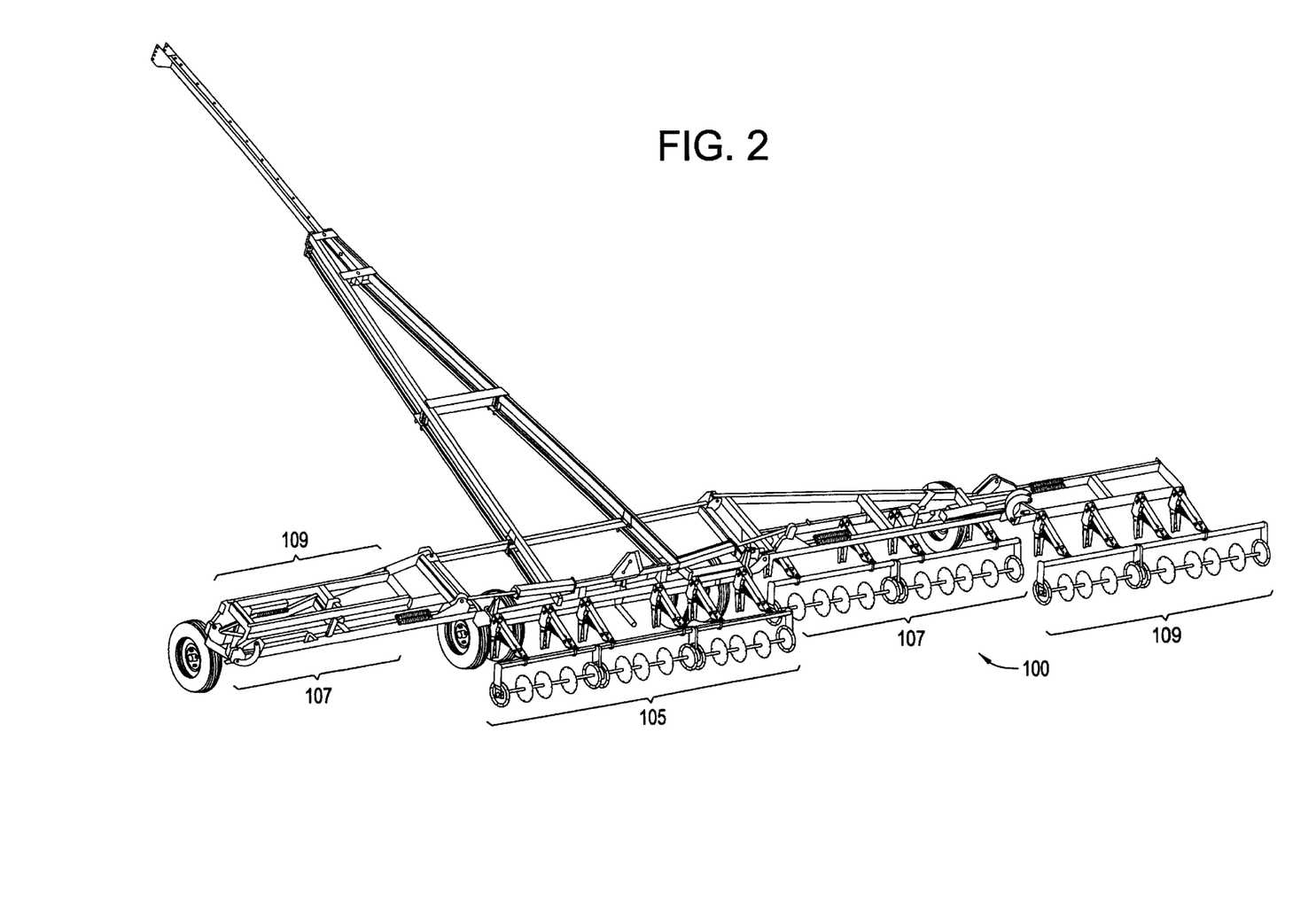
FIG. 2 shows the outer wing completely folded onto an inner wing.

FIGS. 1 and 2 show an implement 100, with the implement 100 transitioning from an operational mode to a transport mode. The implement 100 includes a hitch 103, a frame 105, inner wings 107, and outer wings 109. FIG. 1 shows the implement 100 with an outer wing 109 partially folded, while FIG. 2 shows the outer wing 109 completely folded onto the inner wing 107.

Figure 3:
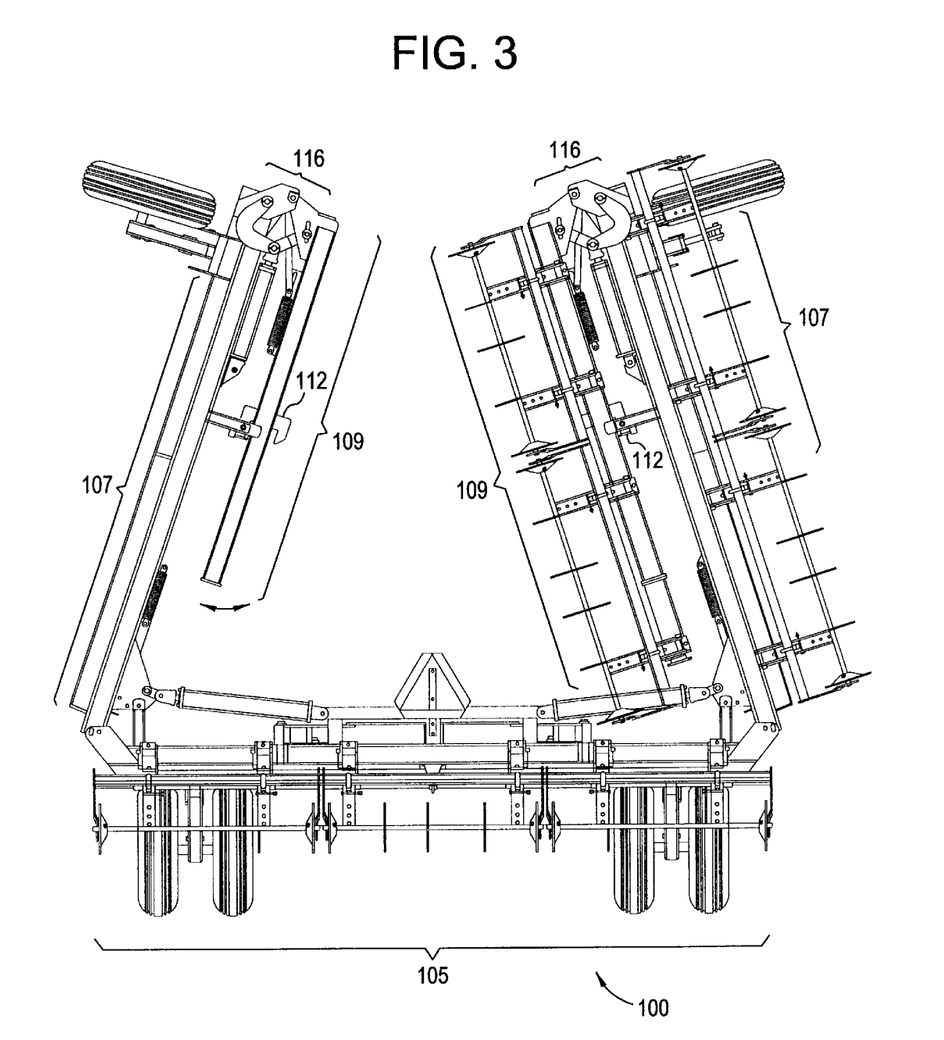
FIG. 3 shows the implement in a fully folded (transport) configuration.

FIG. 3 shows the implement 100 in a fully folded (transport) configuration. The folded outer and inner wings 107 and 109 are further folded with respect to the frame 105. The implement 100 also includes positive action gravity latches 112, which hold the outer wings 109 in the folded position relative to the inner wings 107. Also shown is an implement wing weight transfer apparatus 116 of the present invention, which will be shown and discussed in greater detail below.

It should be understood that the folding arrangement shown is merely one example, and other implement folding arrangements may be employed with the present invention. For example, the present invention may be used on implements having only a single outer wing, or on implements having more that two wings per side. Therefore the inner wing 107 may be a first panel and the frame 105 a second panel, or the outer wing 109 may be the first panel and the inner wing 107 the second panel. In addition, the wings may not fold completely over and on top of a lower wing, and may not necessarily fold with respect to the frame 105.

Figure 4:
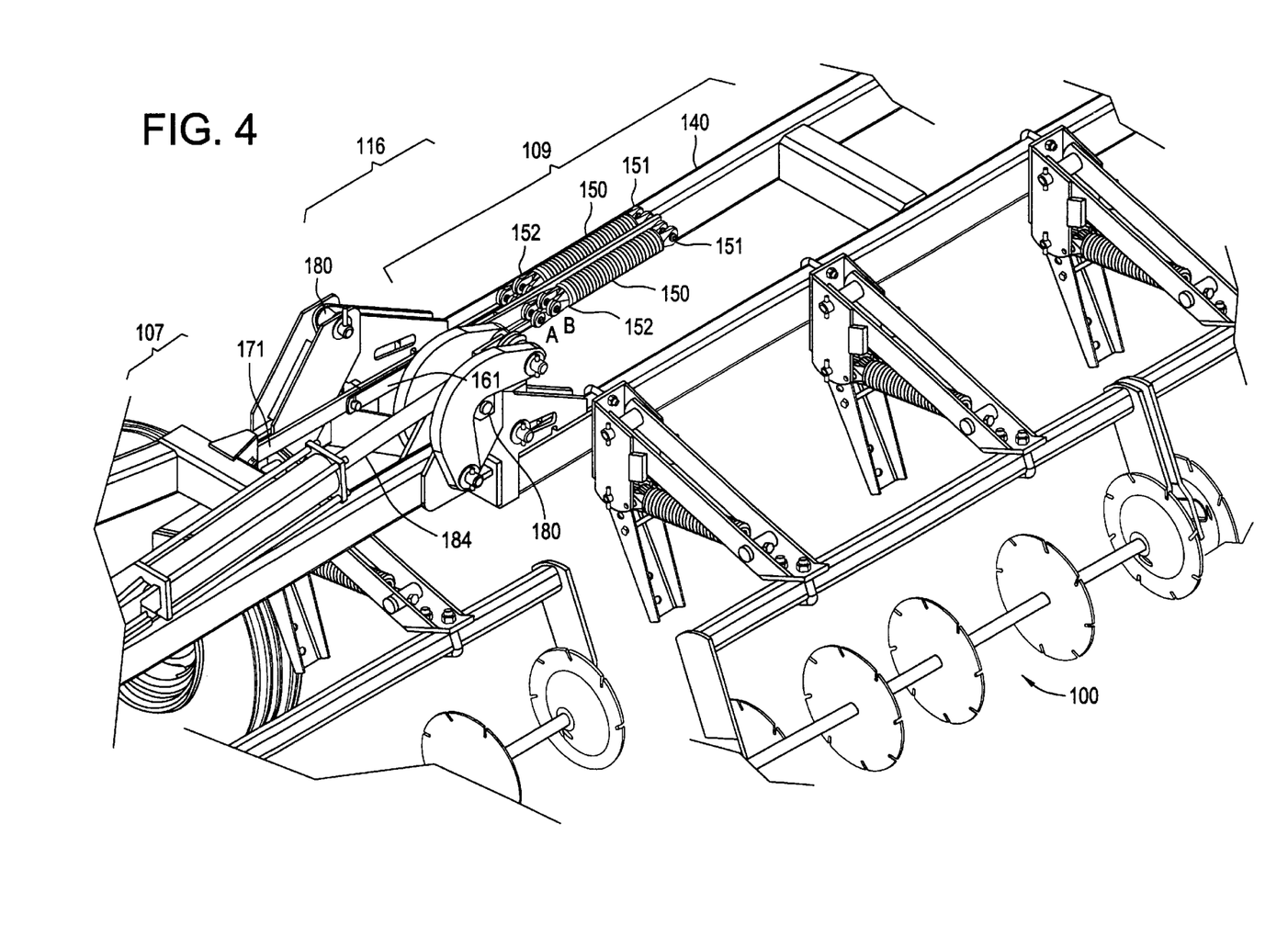
FIG. 4 shows detail of an implement wing weight transfer apparatus of the present invention.

FIG. 4 shows detail of the implement wing weight transfer apparatus 116 of the present invention. The implement 100 includes a biasing device 150, a first weight transfer link 161, and a second weight transfer link 171. The biasing device 150 may include a spring or springs, and in the preferred embodiment is a pair of coil springs 150. A first end 151 of the biasing device 150 is fixedly connected to a frame member 140 of the implement 100, while a second end 152 is slidably connected to the frame member 140. The second end 152 includes a pin 155 which travels in a slot 157 in the frame member 140 (see FIGS. 5–8 for the slot 157). The pin 155 also passes through a first end 163 of the first weight transfer link 161 to rotatably connect the first weight transfer link 161 to the biasing device 150 (see FIGS. 7–8). A pin 168 passes through a second end 164 of the first weight transfer link 161 and also through a first end 173 of the second weight transfer link 171 (again see FIGS. 7–8). The first weight transfer link 161 is therefore rotatably connected to the second weight transfer link 171. The second end 174 of the second weight transfer link 171 is rotatably connected to the frame 105 by a pin 178.

For folding operations, the inner wing 107 is hinged to the frame 105 by hinges 180 and by an actuator 184. In the preferred embodiment, the actuator 184 is a hydraulic cylinder. Likewise, the outer wing 109 is hinged to the inner wing 107 and may be folded over to rest on the inner wing 107.

In use, the outer wing 109 would be first folded over onto the inner wing 107, and then the two would be folded up (and optionally over onto) the frame 105.

Although FIG. 4 shows the implement wing weight transfer apparatus 116 interposed between the inner wing 107 and the outer wing 109, it should be understood that the present invention may also be interposed between the frame 105 and the inner wing 107.

The first weight transfer link 161 and the second weight transfer link 171 are not connected to and do not necessarily move identically to the hinges 180 and the actuator 184. It should be noted that the configuration of the hinges 180 and the actuator 184 may be varied as desired while still being used in conjunction with the present invention.

Figure 6:
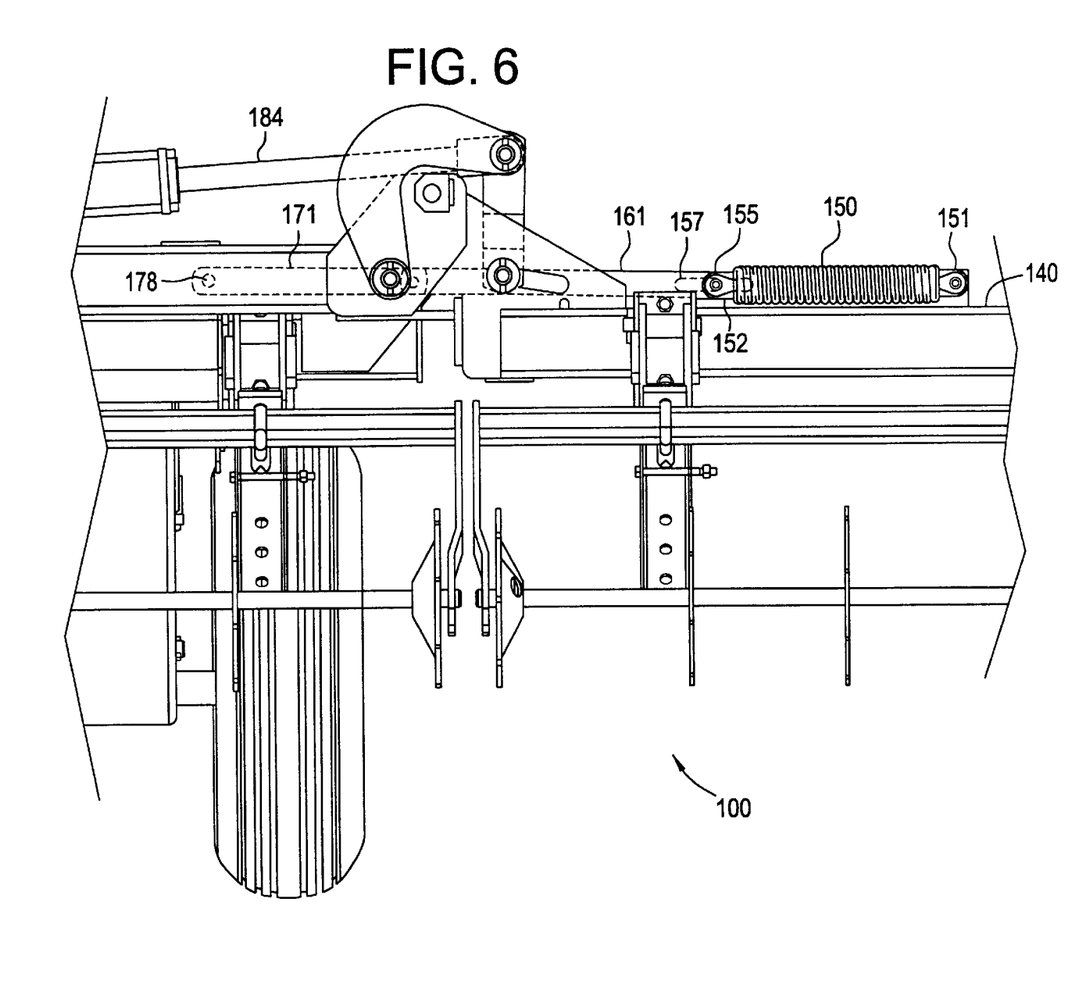
FIG. 6 shows the implement in an unfolded, operational position.

Positions A and B in FIG. 4 show possible positions of the second end 152 of the biasing device 150, such as in a transport mode (see FIG. 8), or in an operational mode (see FIG. 6).

Figure 5:
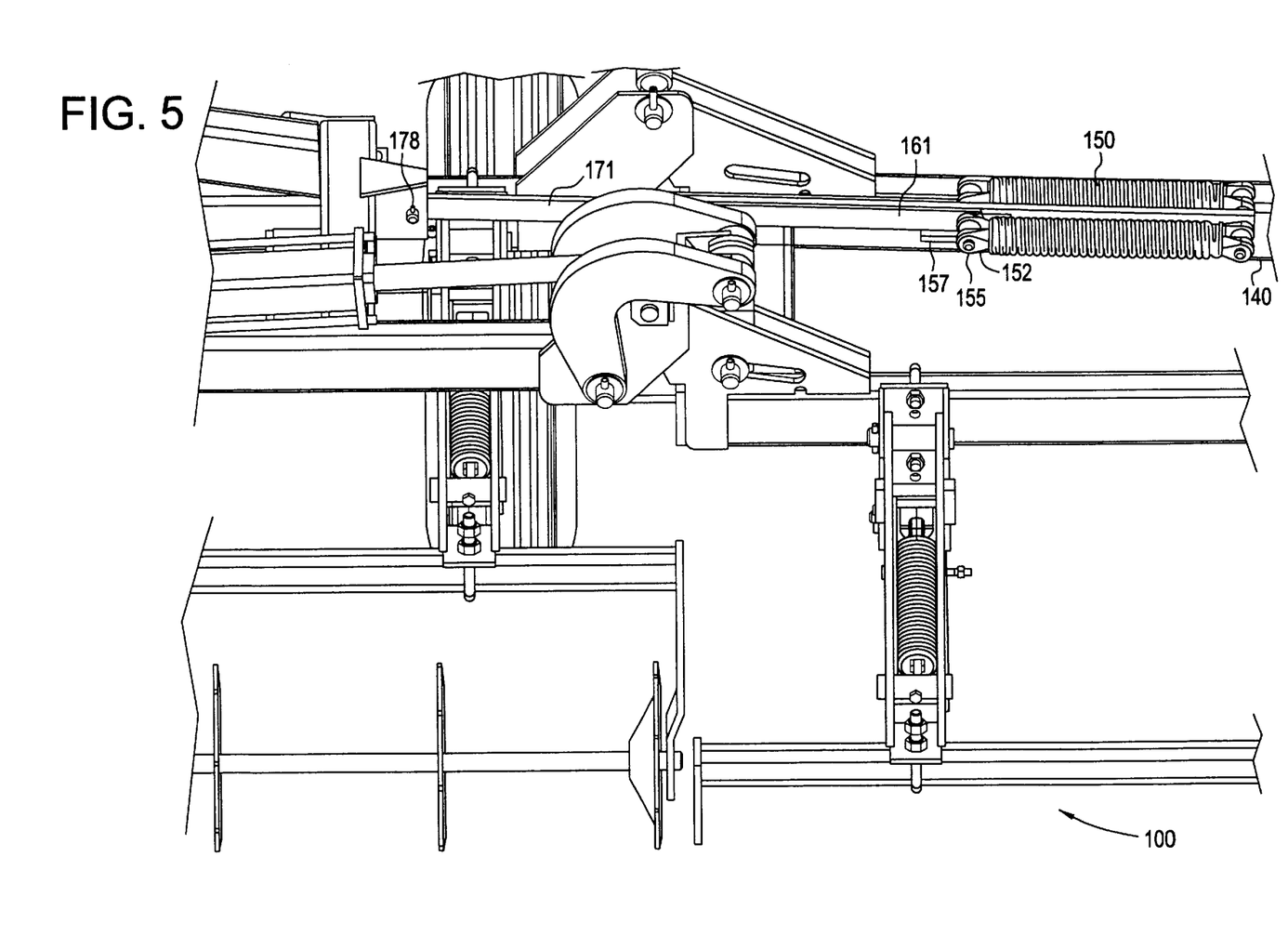
FIG. 5 shows another view of the apparatus of the present invention.

FIG. 5 shows another view of the apparatus of the present invention.

Figure 7:
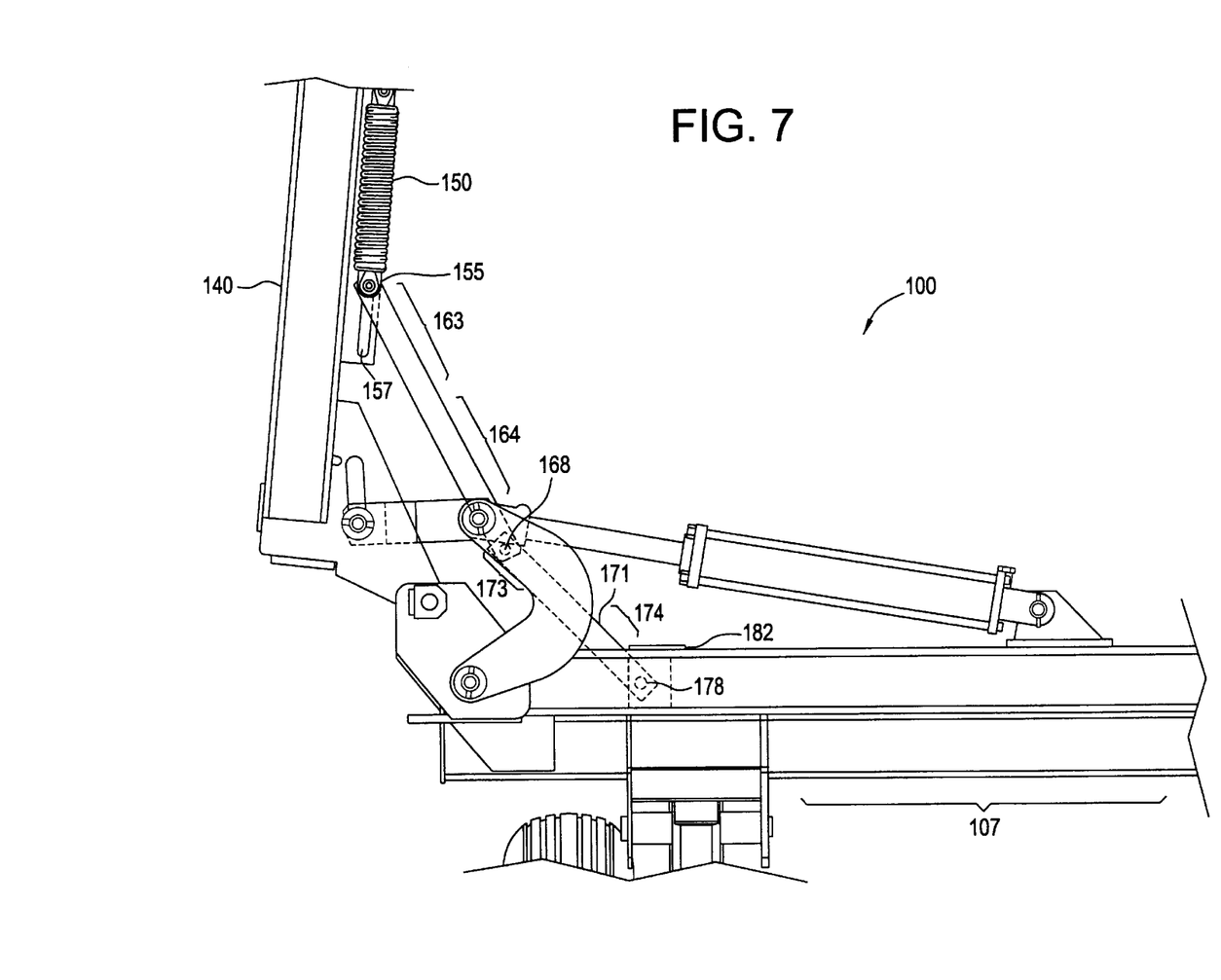
FIG. 7 shows the implement in a partially folded position, illustrating how a first weight transfer link and a second weight transfer link rotate.
Figure 8:
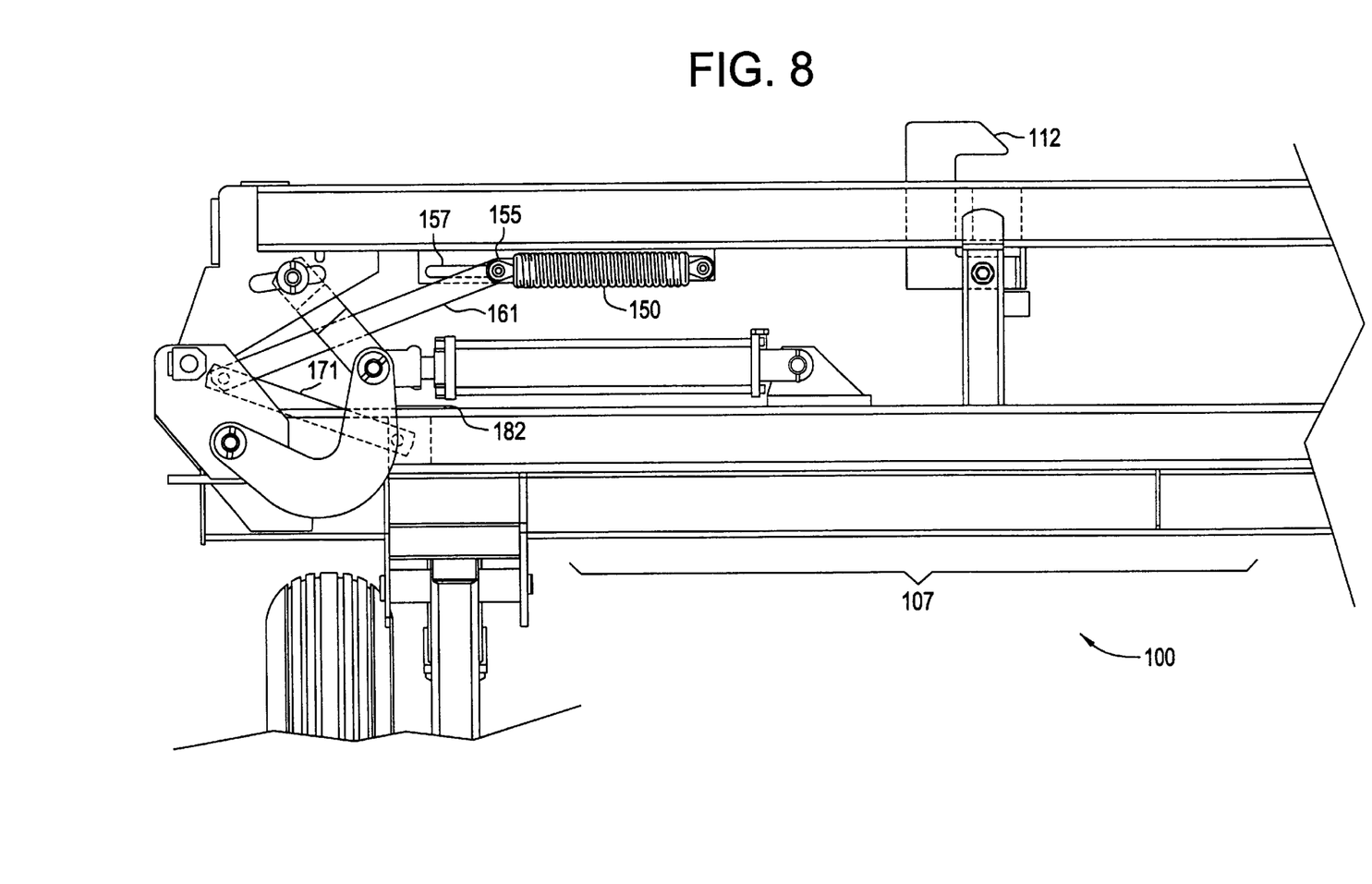
FIG. 8 shows a completely folded position (i.e., a transport position)

FIGS. 6–8 show the apparatus of the present invention in unfolded, partially folded, and folded positions. The unfolded position of FIG. 6 is an operational mode, wherein all wings of the implement 100 are extended for use.

In the operational mode, the second end 152 of the biasing device 150, and the accompanying pin 155, reside at substantially the center of the slot 157. The length of the slot 157 may be such that the biasing device 150 may be stretched or compressed by the motion of the pin 155 and the wing weight transfer links 161 and 171. In a preferred operational mode, as shown, the biasing device 150 is placed under tension (stretched) by the first weight transfer link 161 and the second weight transfer link 171. The apparatus therefore tends to provide a force counter to gravity, such as when a wing drops below a position collinear with the wing 107 or collinear with an adjacent wing.

FIG. 7 shows the implement 100 in a partially folded position, illustrating how the first weight transfer link 161 and the second weight transfer link 171 rotate. The first weight is transfer link 161 rotates with respect to the biasing device 150 and the frame member 140. The first weight transfer link 161 additionally rotates with respect to the second weight transfer link 171, and the second weight transfer link 171 rotates with respect to the wing 107. FIG. 7 also shows a stop 182 formed as part of the wing 107. The stop 182 prevents the second weight transfer link 171 from rotating past a predetermined angle of rotation. This prevents the first and second weight transfer links 161 and 171 from becoming collinear.

FIG. 8 shows a completely folded position (i.e., a transport position). Note how the first weight transfer link 161 and the second weight transfer link 171 have folded, with the rotation of the second weight transfer link 171 being limited by the stop 182. Also note that the biasing device 150 may be under no tension in the fully folded position of the implement 100. Alternatively, in a lesser preferred embodiment, the biasing device 150 may be under some compression in the fully folded position. In the folded position, the actuator 184 is in a fully retracted position and the pin 155 is substantially at the end of the slot 157. Also shown is a positive action gravity latch 112, which will be discussed below.

The implement wing weight transfer apparatus 116 of the present invention as described above solves several problems associated with folding implements. First, it addresses the uneven loading of the implement 100 due to the differing weights of the wings 107 and 109 and the central frame. The differing weights and loadings are the result of the necessity for more and/or heavier frame structure in the inner wing 107, frame 105, and hitch 103. The increased and/or heavier framework does not allow conventional implements to yield a satisfactory field finishing function.

Second, the implement wing weight transfer apparatus 116 of the present invention removes the need to supply a weight transfer force by use of the actuators 184. This reduces wear on the hydraulic system of the implement 100 and a hydraulic pump and system of an associated tractor.

Third, the present invention can generate the weight transfer force without the rigidity of the actuators 184, allowing the wings 107 and 109 to flex in some amount.

Fourth, the present invention operates even if a hydraulic pressure fluctuates or is absent.

Figures 9A, 9B:
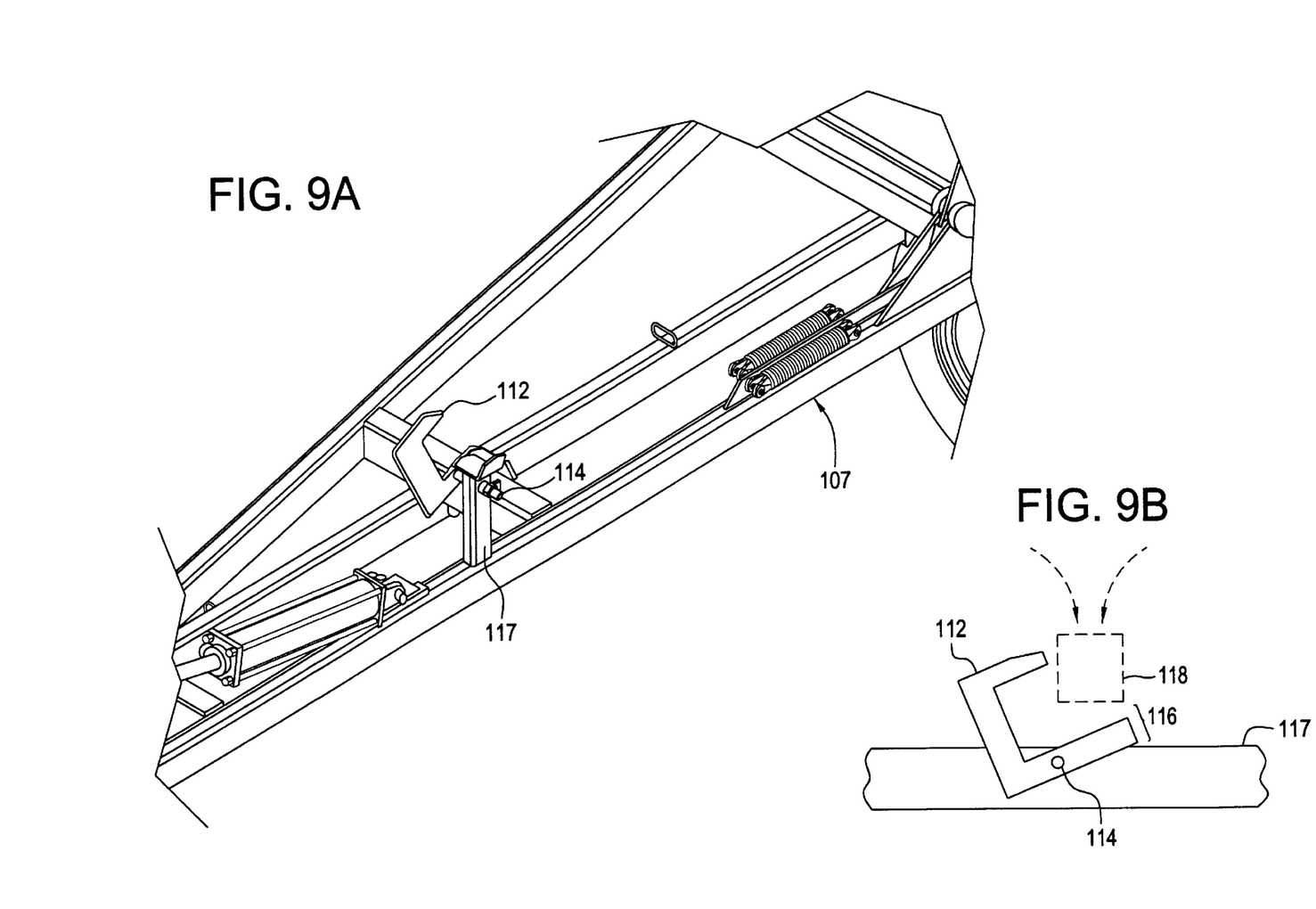
FIGS. 9A–9B show a positive action gravity latch when not engaged.

FIGS. 9A–9B show the positive action gravity latch 112 when not engaged. The positive action gravity latch 112 includes a pin 114 on which the positive action gravity latch 112 may rotate, and through which the positive action gravity latch 112 may be rotatably mounted to a supporting frame member 117. The dashed box represents a movable frame member 118 which may be lowered onto the positive action gravity latch 112 as part of a folding operation. The movable frame member 118 may contact an extended portion 116 of the positive action gravity latch 112, and may cause the positive action gravity latch 112 to rotate about the pin 114.

Figures 10A, 10B:
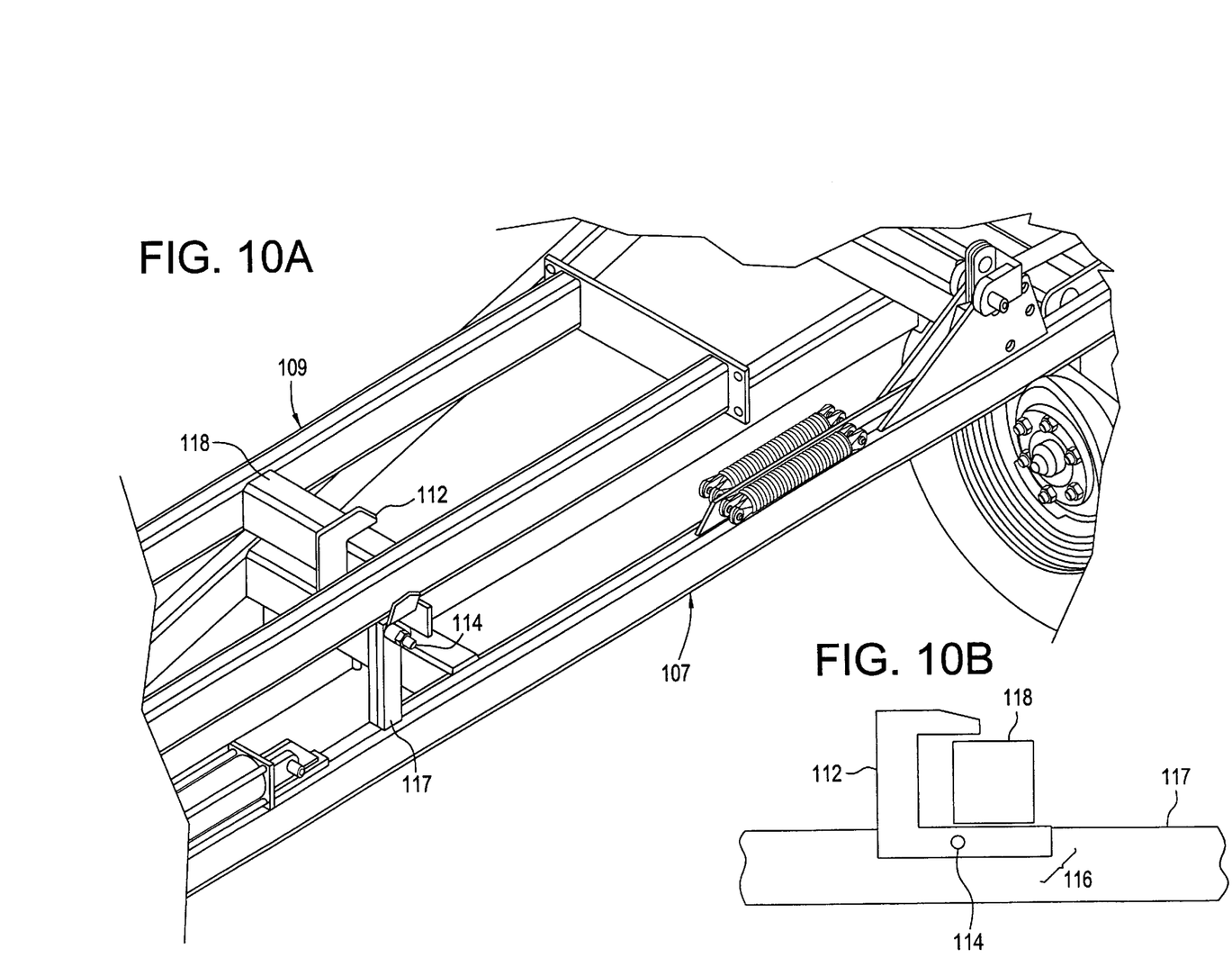
FIGS. 10A–10B show the positive action gravity latch engaged with the frame member.

FIGS. 10A–10B show the positive action gravity latch 112 engaged with the movable frame member 118. The movable frame member 118 has pushed down the extended portion 116, rotating the positive action gravity latch 112 to hold the movable frame member 118 in place. The positive action gravity latch 112 is therefore positively actuated by the weight of the movable frame member 118 and associated structure (i.e., the outer wing 109, but could also apply to a latch for holding the inner and outer wings 107 and 109 in position with respect to the frame 105).

The positive action gravity latch 112 has several purposes. First, the positive action gravity latch 112 prevents a premature motion of the outer wing 109 when the implement 100 is in transition from the transport position to the operational (field working) position. The positive action gravity latch 112 assures that the outer wing 109 is locked in the folded position on the inner wing 107 until the outer wing 109 is moved off of the positive action gravity latch 112 by a corresponding actuator 184. If the outer wing 109 unfolds too quickly, the overall height of the implement 100 becomes excessive and could pose a potential overturning hazard, and could put excessive stress onto the framework of the implement 100.

Second, the positive action gravity latch 112 prevents the two outer wings 109 from colliding and possibly interlocking as the implement 100 unfolds.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An implement wing weight transfer apparatus for an implement having a first panel hinged to a second panel, with said first panel capable of folding with respect to said second panel, said implement wing weight transfer apparatus comprising:
    a biasing device, with a first end of said biasing device being fixedly connected to said second panel and a second end of said biasing device being slidably connected to said second panel;
    a first weight transfer link, having first and second ends, with said first end rotatably connected to said second end of said biasing device; and
    a second weight transfer link, having first and second ends, with a first end rotatably connected to said second end of said first weight transfer link and with a second end of said second weight transfer link rotatably connected to said first panel;
    wherein in a transport mode said first and second weight transfer links fold up to allow said folding of said first panel with respect to said second panel, and in an operational mode said biasing device exerts a weight transfer bias tension on said first and second weight transfer links.

2. The implement wing weight transfer apparatus of claim 1, wherein said first panel is a wing and said second panel is a frame portion.

3. The implement wing weight transfer apparatus of claim 1, wherein said first panel is an outer wing and said second panel is an inner wing.

4. The implement wing weight transfer apparatus of claim 1, wherein said biasing device exerts said weight transfer bias tension independent of any external force.

5. The implement wing weight transfer apparatus of claim 1, wherein said weight transfer bias tension increases if said first panel drops below a position collinear with said second panel.

6. The implement wing weight transfer apparatus of claim 1, wherein said second end of said biasing device is slidably connected to a slot in said second panel.

7. The implement wing weight transfer apparatus of claim 1, wherein said biasing device is at least one spring.

8. The implement wing weight transfer apparatus of claim 1, wherein said biasing device is at least one coil spring.

9. The implement wing weight transfer apparatus of claim 1, further including a stop adjacent to said first weight transfer link, wherein said stop limits a rotation of said first weight transfer link at a predetermined angle of rotation.

10. The implement wing weight transfer apparatus of claim 1, further including a positive action gravity latch, said latch comprising:
    a C-shaped hook having a substantially rectangular shape with a bottom portion, a side portion, and a top portion, with said bottom portion having an extended portion and being longer than said top portion; and
    a pin upon which said C-shaped hook is rotatably mounted, with said pin being substantially centered in said bottom portion;
    wherein when a frame member contacts said extended portion of said bottom portion, said C-shaped hook pivots around said pin and said top portion moves over said frame member, holding said frame member in position.

11. The positive action gravity latch of claim 10, wherein said positive action gravity latch is used to hold said wing in a folded position.

* * * * *